US010829955B2

(12) United States Patent
Hawle et al.

(10) Patent No.: US 10,829,955 B2
(45) Date of Patent: Nov. 10, 2020

(54) DOOR SWITCH ARRANGEMENT FOR A LAVATORY DOOR DEVICE OF AN AIRCRAFT

(71) Applicant: Airbus Operations GmbH, Hamburg (DE)

(72) Inventors: Daniel Hawle, Hamburg (DE); Dennis Gallun, Hamburg (DE); Kevin Foth, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 16/519,178

(22) Filed: Jul. 23, 2019

(65) Prior Publication Data

US 2020/0032548 A1    Jan. 30, 2020

(30) Foreign Application Priority Data

Jul. 25, 2018   (DE) .................. 10 2018 117 978

(51) Int. Cl.

| E05B 17/22 | (2006.01) |
| B64D 11/02 | (2006.01) |
| E05B 47/00 | (2006.01) |
| E05B 41/00 | (2006.01) |
| E05B 17/00 | (2006.01) |
| E05B 63/00 | (2006.01) |

(52) U.S. Cl.
CPC .............. *E05B 17/22* (2013.01); *B64D 11/02* (2013.01); *E05B 41/00* (2013.01); *E05B 47/0047* (2013.01); *E05B 17/0083* (2013.01); *E05B 63/0052* (2013.01)

(58) Field of Classification Search
None
See application file for complete search history.

(56) References Cited

U.S. PATENT DOCUMENTS

| 4,994,722 A * | 2/1991 | Dolan ................... B64D 11/02 244/129.5 |
| 6,633,239 B2 | 10/2003 | Plude et al. |
| 2004/0227034 A1* | 11/2004 | Wentland .............. B64D 11/02 244/119 |
| 2007/0241927 A1* | 10/2007 | Ratnakar ................ G06Q 10/02 340/4.6 |
| 2008/0224858 A1 | 9/2008 | Boemer |
| 2009/0261973 A1 | 10/2009 | Eakle, Jr. |
| 2009/0300988 A1* | 12/2009 | Bem ....................... E05B 47/02 49/340 |

(Continued)

FOREIGN PATENT DOCUMENTS

| EP | 2924201 A1 | 9/2015 |
| EP | 3056638 A1 | 8/2016 |
| WO | 2016064816 A1 | 4/2016 |

OTHER PUBLICATIONS

German Search Report; priority document.

*Primary Examiner* — Emily C Terrell
(74) *Attorney, Agent, or Firm* — Greer, Burns & Crain, Ltd.

(57) ABSTRACT

To reduce complexity, solve tolerance problems and increase reliability and customer satisfaction, a door switch arrangement for a lavatory of an aircraft is provided, wherein, to generate signals which indicate a current status of the lavatory door, the door switch arrangement uses a sensor device with contactlessly operating reed sensors.

17 Claims, 10 Drawing Sheets

(56) References Cited

U.S. PATENT DOCUMENTS

| | | | | |
|---|---|---|---|---|
| 2011/0080252 A1* | 4/2011 | Ibsies | ............... | E05B 41/00 340/3.1 |
| 2014/0196372 A1* | 7/2014 | Boren | ............... | E05F 15/00 49/31 |
| 2015/0233146 A1* | 8/2015 | Klevens | ............ | E05B 41/00 340/687 |
| 2017/0292290 A1 | 10/2017 | Schildwachter et al. | | |

* cited by examiner

DOOR SWITCH ARRANGEMENT FOR A LAVATORY DOOR DEVICE OF AN AIRCRAFT

CROSS-REFERENCES TO RELATED APPLICATIONS

This application claims the benefit of the German patent application No. 10 2018 117 978.2 filed on Jul. 25, 2018, the entire disclosures of which are incorporated herein by way of reference.

FIELD OF THE INVENTION

The invention relates to a door switch arrangement for a lavatory door device of an aircraft. The invention furthermore relates to a lavatory door device of an aircraft, which is equipped with said door switch arrangement.

BACKGROUND OF THE INVENTION

In the technical field of aircraft, door switch arrangements are generally required to display the status of the lavatory, for example as "occupied" or "vacant," for the passengers and crew. With regard to an evacuation situation, it also provides additional safety information. An example of an automatic door locking system for a lavatory of an aircraft is disclosed, for example, in U.S. Pat. No. 4,994,722 A. Monitoring of a door lock is known from EP 3 056 638 A1.

The architecture of the lavatories of different aircraft can differ considerably from one another. Even for a single aircraft manufacturer, there are generally numerous different systems which have to developed and adapted by suppliers according to the specific construction. This is unfavorable in light of an increasing demand for the simplification of the production process, also in terms of logistics, and the visibly increasing expectations of the passengers, as end users, with regard to comfort.

SUMMARY OF THE INVENTION

In the present case, an object of the invention is to improve door switch arrangements, in particular in terms of simplified manufacturability, simplified maintainability, increased reliability and increased comfort.

The invention provides a door switch arrangement for a lavatory door device for an aircraft, which has a lavatory door leaf which is lockable by means of a locking element on a lavatory door frame region, wherein the door switch arrangement is designed to generate a closure status signal according to a lavatory door leaf position of the lavatory door leaf and a locking status signal according to a locking element position of the locking element, wherein the door switch arrangement comprises a sensor device which is designed for contactless detection of the lavatory door leaf position and the locking element position in order to generate the closure status signal and the locking status signal.

The door switch arrangement preferably comprises an actuating device, which is movable by means of the locking element and is designed to actuate the sensor device for generating the locking status signal depending on the locking element position.

It is preferred that the actuating device has a lever element which is pivotable about a lever axis as a result of a movement, in particular as a result of a locking movement and/or unlocking movement, of the locking element, wherein an actuating element for contactlessly triggering the sensor device, in particular the first sensor, is arranged on a first lever element end.

It is preferred that the lever element, as a result of a locking movement of the locking element, can be transferred from a first lever position, in which the passage opening is covered by the lever element, into a second lever position, in which the sensor device, in particular the first sensor, is actuated for generating the locking status signal, wherein the lever element, as a result of the unlocking movement of the locking element, is movable from the second lever position into the first lever position.

The door switch arrangement preferably comprises a fastening plate by means of which the sensor device can be fastened on the lavatory door frame region.

It is preferred that the actuating device is pivotably coupled to the fastening plate.

It is preferred that the fastening plate has a passage opening for the locking element, wherein the locking element passes through the passage opening in the locked state.

It is preferred that the actuating device is designed to cover and/or to close the passage opening, in particular completely, in the unlocked state of the locking element.

The door switch arrangement preferably comprises an activating device, which is designed to be movable together with the lavatory door leaf in order to contactlessly actuate the sensor device for generating the closure status signal depending on the lavatory door leaf position.

It is preferred that the sensor device has a plurality of contactless sensors, wherein a first sensor is designed and arranged to be contactlessly actuated by the actuating device, wherein a second sensor is designed and arranged to be contactlessly actuated by the activating device.

It is preferred that the activating device comprises an activating element which is held by a holding element, wherein the holding element preferably comprises an inlet opening for resin and a channel structure, fluidically connected to the inlet opening, for the resin in order to fasten the activating device in the lavatory door leaf.

The door switch arrangement preferably comprises a housing device within which the sensor device is accommodated, wherein the housing device, in particular, comprises a housing module which is designed for receiving the sensor device.

It is preferred that the fastening plate is additionally designed for closing the housing device, in particular the housing module, and fastening the sensor device within the lavatory door leaf frame region.

The door switch arrangement preferably has one or more adapter plates, which are designed for closing a gap which remains between the fastening plate and the lavatory door leaf frame region, depending on the design of the lavatory door device.

It is preferred that the door switch arrangement can be received completely within the lavatory door leaf and/or the lavatory door frame region.

It is preferred that the door switch arrangement, preferably with the exception of the activating device, is designed as an individual installable module.

The invention provides a lavatory door device for an aircraft, comprising a lavatory door leaf, which is movable between an open position and closed position, a lavatory door leaf frame on which the lavatory door leaf is movably, in particular pivotably, foldably and/or displaceably mounted, and a door switch arrangement, wherein the sensor device is received and fastened on and/or within the lavatory door leaf frame.

It is preferred that the activating device is arranged within the lavatory door leaf such that the activating device can contactlessly actuate the sensor device for generating the closure status signal depending on the lavatory door leaf position.

Furthermore, a lavatory door system for an aircraft can be provided, which comprises a preferred door switch arrangement and/or a preferred lavatory door device, wherein the locking status signal is selected from a group of statuses which includes "locked" and "unlocked," wherein the closure status signal is selected from a group of statuses which includes "closed" and "open" in order to control the lighting within the lavatory and/or the lavatory status display outside the lavatory, for example in the cabin and/or in the cockpit and/or an operator terminal depending on the statuses.

According to the invention, it is furthermore proposed to use a door switch arrangement, described herein, in an aircraft for generating a closure status signal and a locking signal for a lavatory door device of the aircraft.

BRIEF DESCRIPTION OF THE DRAWINGS

Exemplary embodiments of the invention are explained in more detail below with reference to the accompanying drawings, which show.

DETAILED DESCRIPTION OF THE PREFERRED EMBODIMENTS

Figure 1:
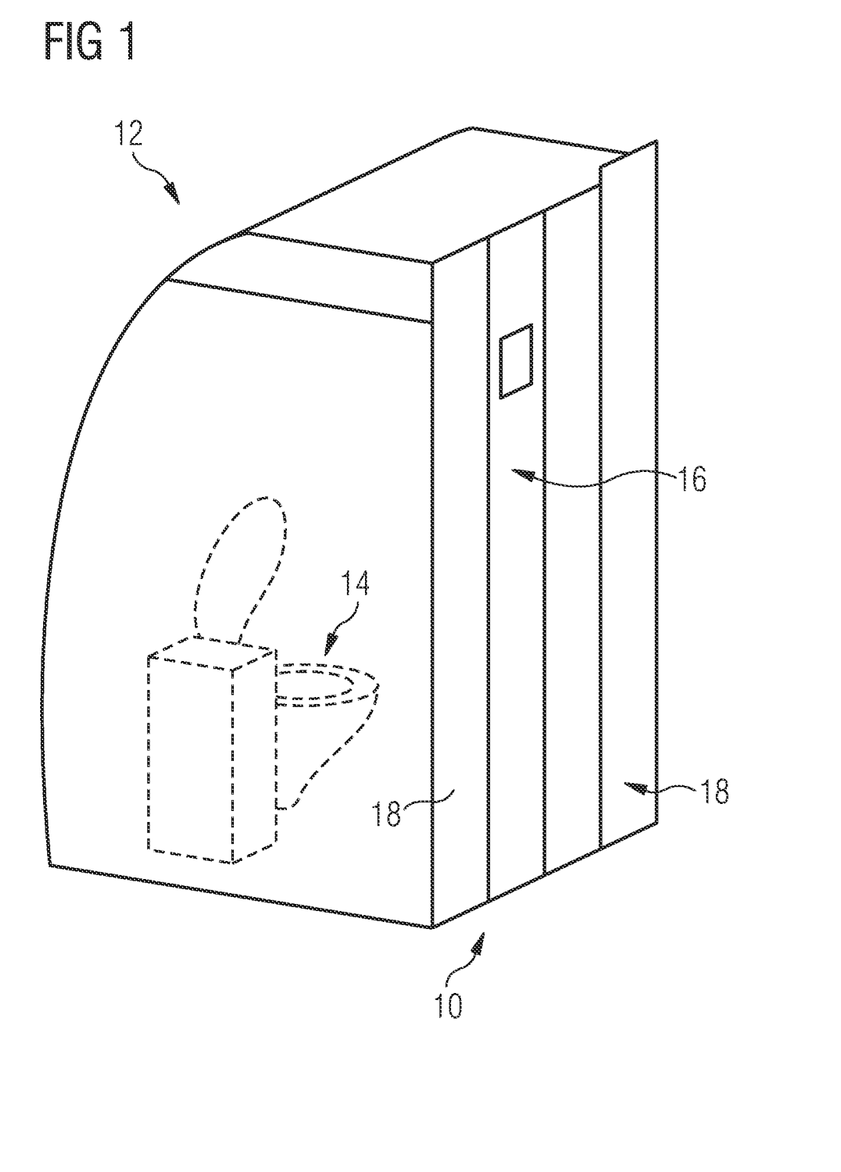
FIG. 1 illustrates an exemplary embodiment of a lavatory.

According to FIG. 1, a lavatory door device 10 is provided on a lavatory 12 of an aircraft (not illustrated in more detail). The lavatory 12 contains conventional sanitary equipment 14, which is known as such.

The lavatory door device 10 comprises a lavatory door leaf 16, which is movably mounted on a lavatory door leaf frame 18. As illustrated in FIG. 1, the lavatory door leaf 16 can be designed as a bi-fold sliding door leaf. Other configurations, such as those explained in part below, are likewise conceivable. Therefore, as illustrated in FIG. 2, the lavatory door leaf 16 can also be designed as a revolving door leaf.

Figure 2:
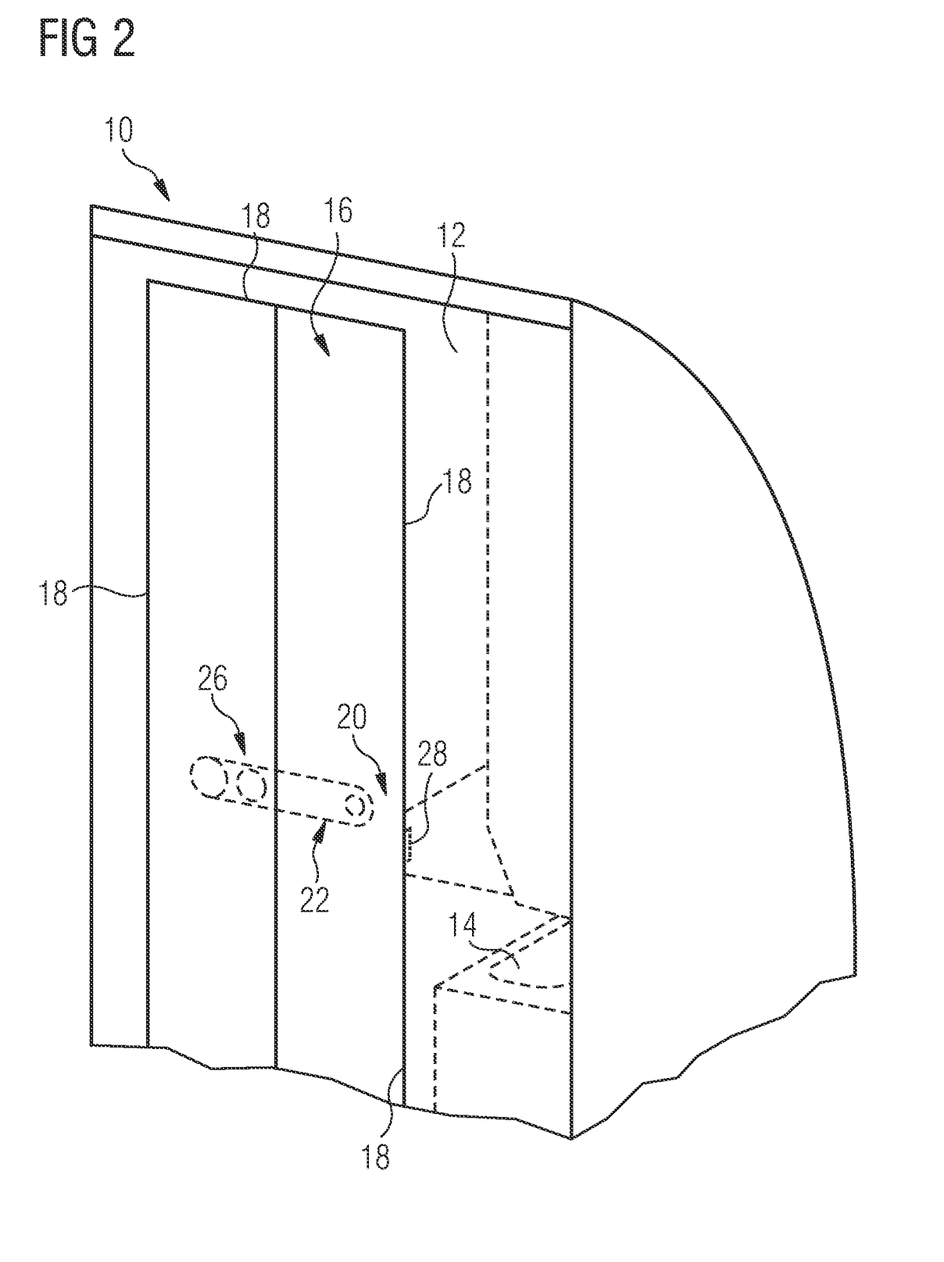
FIG. 2 illustrates an exemplary embodiment of a lavatory door device.

FIG. 2 shows an exemplary embodiment of a door switch arrangement 20. The door switch arrangement 20 is designed to emit signals which are indicative of the operating status of the lavatory 12. Therefore, the door switch arrangement 20 is intended to emit a closure status signal which indicates whether the lavatory door leaf 16 is open or closed. The door switch arrangement 20 is further designed to emit a locking status signal which indicates whether the lavatory door leaf 16 is locked or unlocked.

A locking device 22 is provided on the lavatory door leaf 16, which locking device can be manually actuated by the user of the lavatory 12. The locking device 22 furthermore has at least one locking element 24, which is arranged in the vicinity of the door switch arrangement 20. The locking element 24, can be, but does not have to be, arranged in the vicinity of the operating device 26 which can be manually actuated by the users of the lavatory 12.

Figure 3:
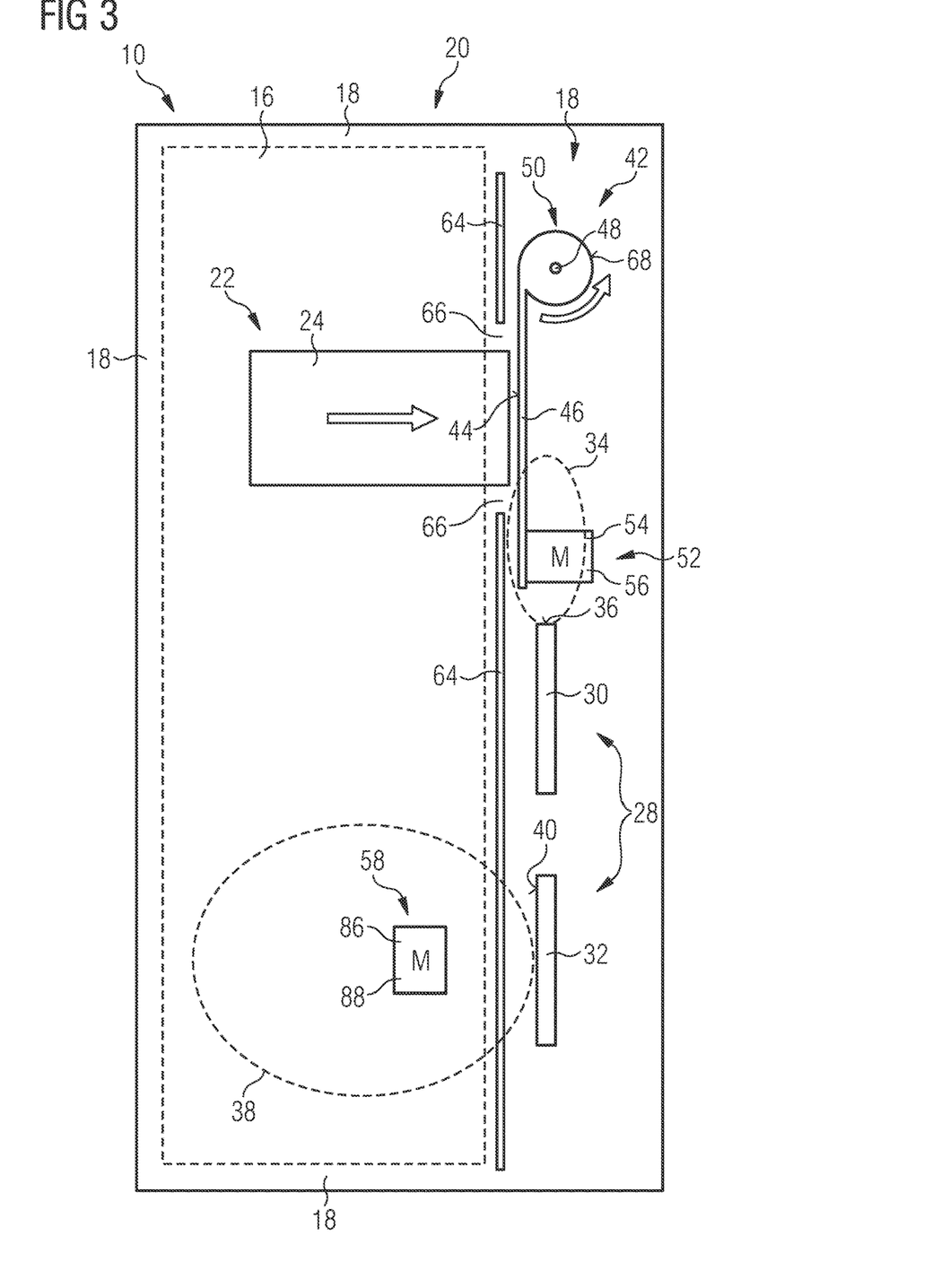
FIG. 3 illustrates a schematic view of a lavatory door device.
Figure 4:
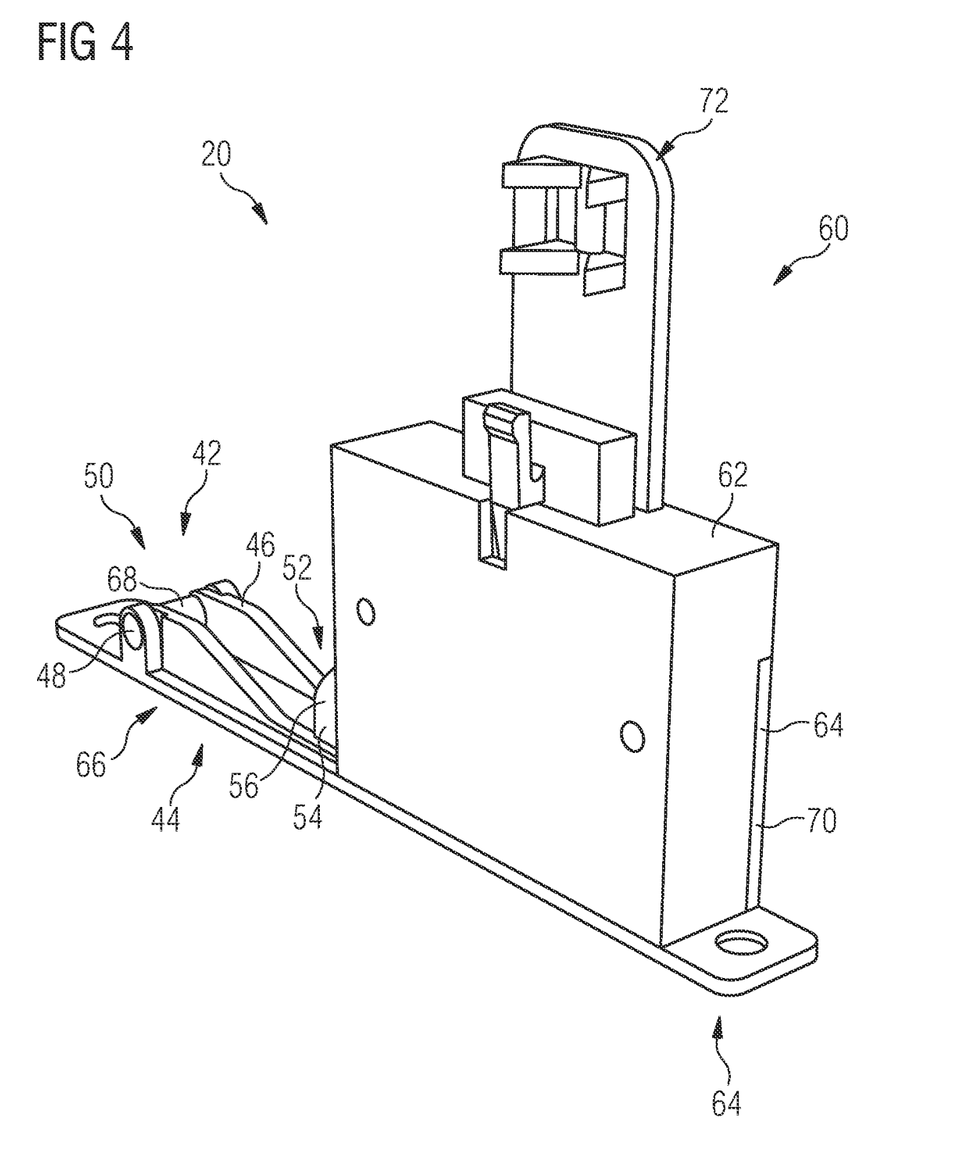
FIG. 4 to FIG. 6 illustrate an exemplary embodiment of a door switch arrangement.
Figure 5:
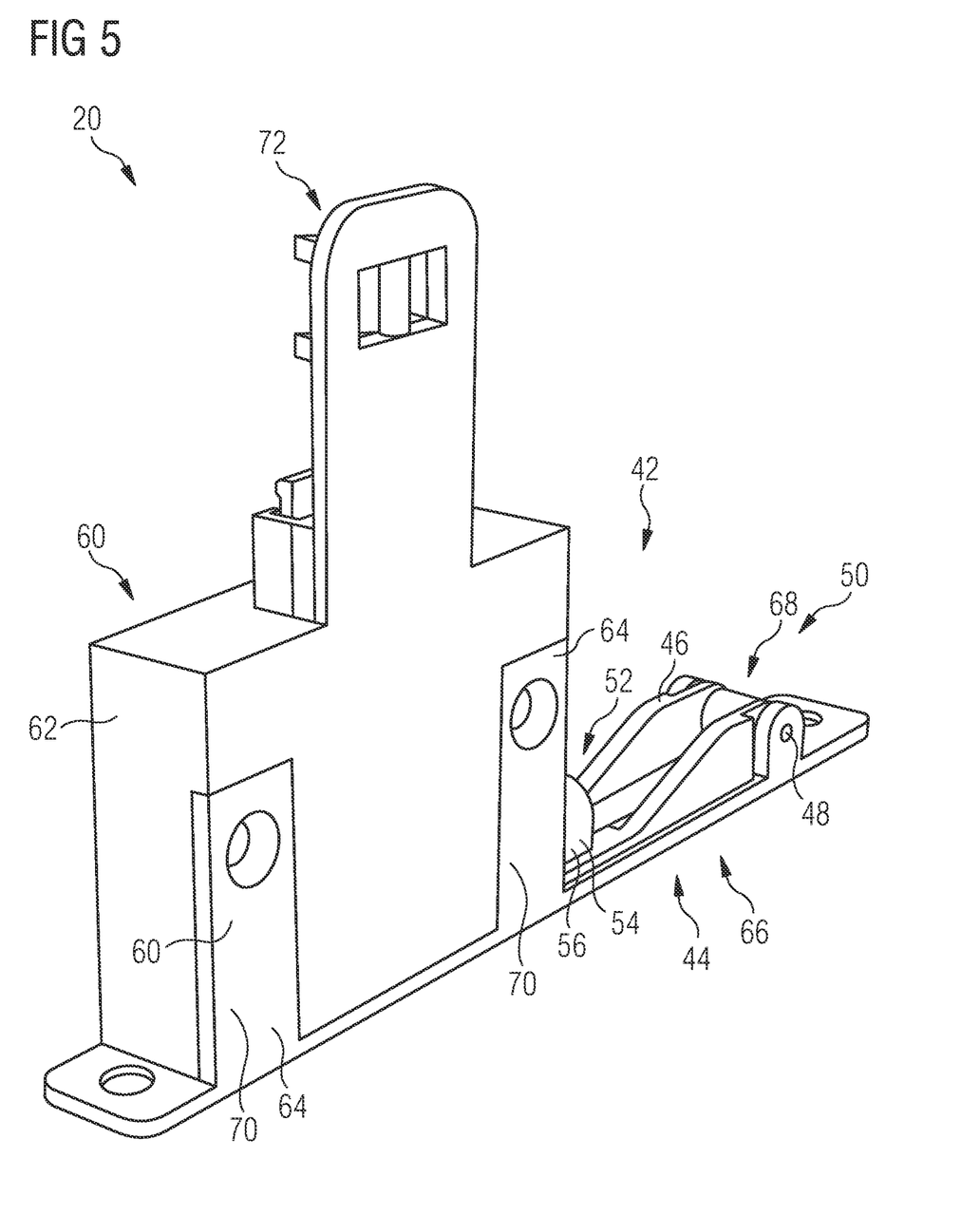
Figure 6:
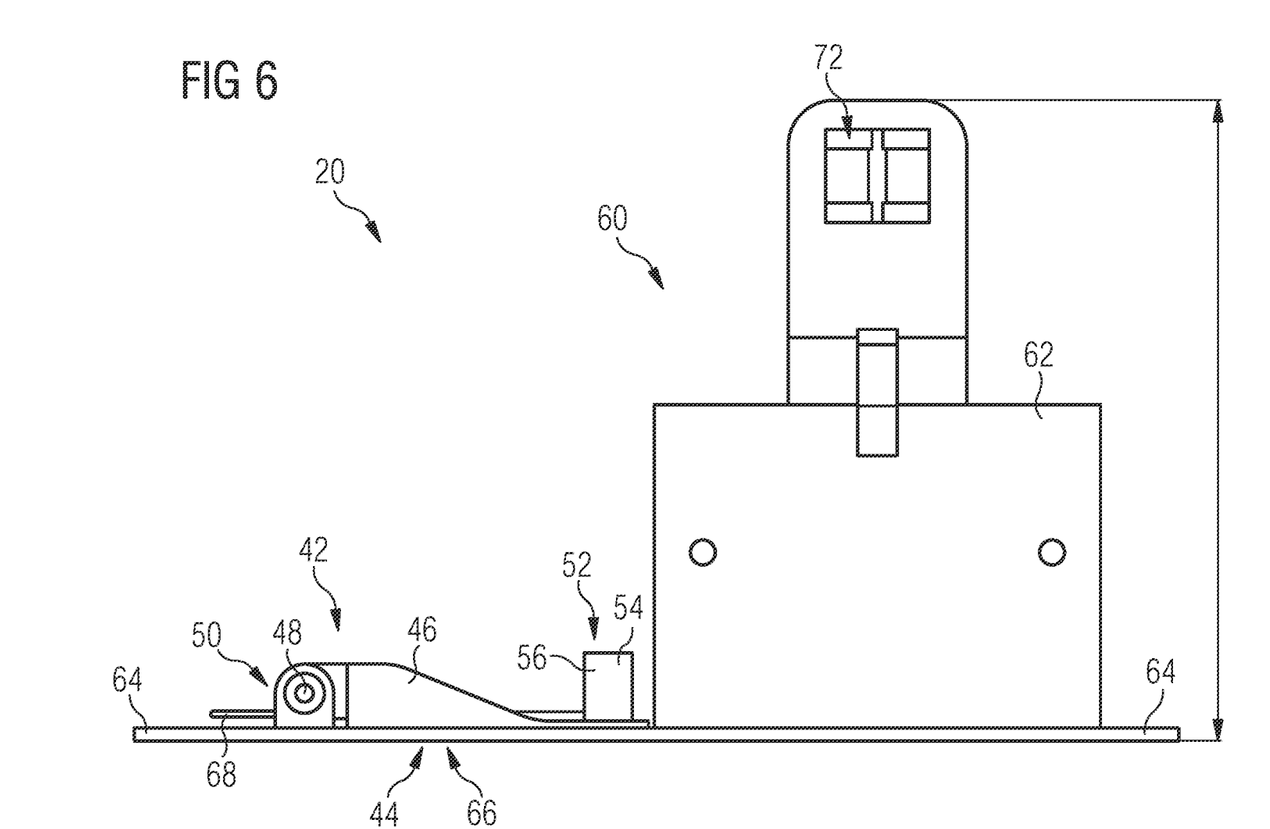

As can be seen in FIG. 3, the door switch arrangement 20 comprises a sensor device 28. The sensor device 28 is arranged in the region of the lavatory door leaf frame 18 and is preferably installed in the lavatory door leaf frame 18. The sensor device 28 in the present case has a contactlessly activatable first sensor 30 and a contactlessly activatable second sensor 32. The first sensor 30 and the second sensor 32 can be designed, for example, as reed sensors or reed contacts. The first sensor 30 can have a first sensor characteristic 34 such that the first sensor 30 in the present case responds when an actuating element is detected at a narrow end face 36 of the first sensor 30.

The second sensor 32 can have a second sensor characteristic 38 such that the second sensor 32 is activated predominantly when an activating element is detected in a region extending from a longitudinal side 40 of the second sensor 32.

The door switch arrangement 20 furthermore comprises an actuating device 42. The actuating device 42 is associated with the first sensor 30 and is designed to merely actuate the first sensor 30. The actuating device 42 has an actuating surface 44 which is engaged by the locking element 24 when the lavatory door leaf 16 is locked.

The actuating device 42 can comprise a lever element 46 on which the actuating surface 44 can be arranged. The lever element is arranged around a lever axis 48. The lever axis 48 can be provided on a first lever element end 50. An actuating element 54 can be held on a second lever element end 52 opposite the first lever element end 50, which actuating element is suitable for actuating the first sensor 30. If the first sensor 30 is designed as a reed contact, the actuating element 54 is preferably designed as an actuating magnet 56.

The door switch arrangement 20 furthermore comprises an activating device 58. The activating device 58 is arranged within the lavatory door leaf 16. The activating device 58 is arranged such that, depending on the lavatory door leaf position of the lavatory door leaf 16, the activating device 58 can be detected by the sensor device 28, in particular the second sensor 32, provided the lavatory door leaf 16 is located in the closed state. The activating device 58 will be explained in more detail later.

Reference is made below to FIGS. 3 to 8. The door switch arrangement 20 comprises a housing device 60. The housing device 60 has a housing module 62 in which the sensor device 28 is received. The door switch arrangement 20 can furthermore have a fastening plate 64 by means of which the housing device 60 can be fastened on the lavatory door leaf frame 18. The fastening plate 64 can simultaneously serve to close the housing module 62.

The fastening device 42 is moreover fixedly mounted on the fastening plate 64. In particular, the fastening plate 64 can have a passage opening 66. If the locking element 24 is located in the unlocked state, the passage opening 66 is covered by the actuating device 42, in particular the lever element 46. To improve the covering action, the actuating device 42 can have a resilient spring element 68 which provides a corresponding restoring force. As can be seen in particular in FIG. 5, the housing module 62 can be pushed onto the fastening plate 64 and connected by means of screw fasteners. The fastening plate 64 has suitable fastening lugs 70 for this.

A strain relief device 72 for a connection cable can furthermore be provided on the housing module 62.

The door switch arrangement 20 can comprise an electrical interface 73. The electrical interface 73 can be arranged on the housing device 60, in particular the housing module 62. The electrical interface 73 is designed, in particular, for the connection cable and/or can have a plug connector 75. The electrical interface 73 is designed to produce the electrical connection and a signal connection to further systems of the aircraft, in particular the cabin systems.

Figure 7:
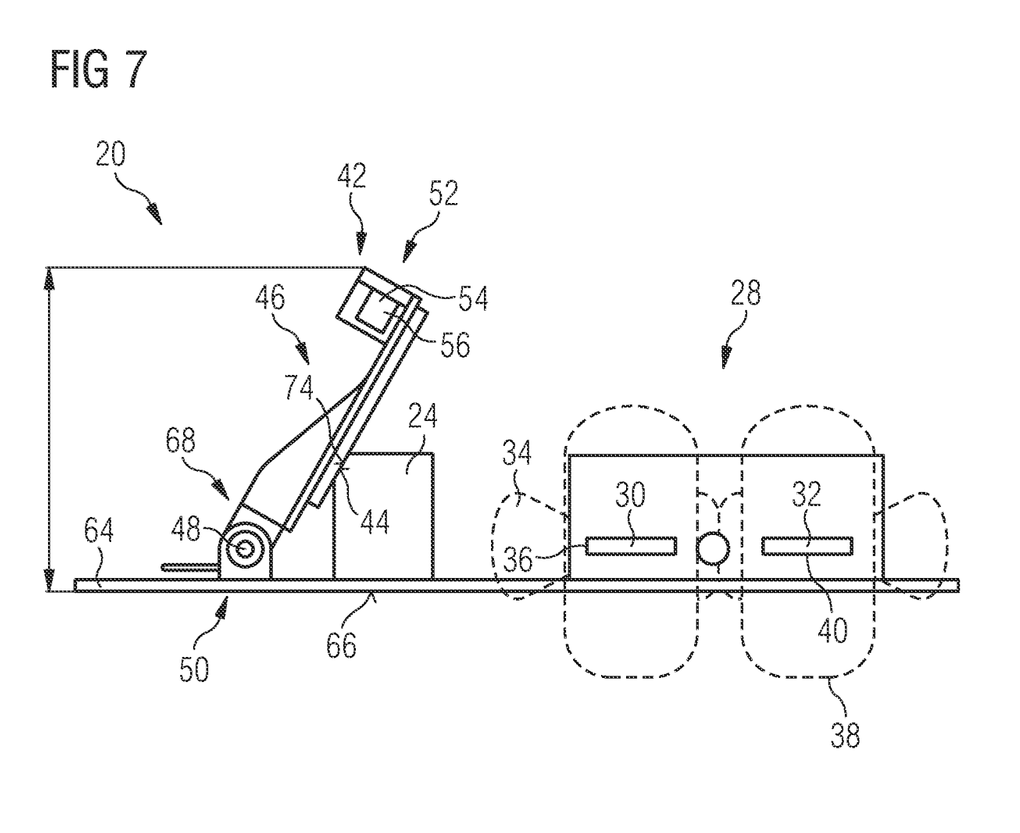
FIG. 7 illustrates a schematic view of the door switch arrangement.
Figure 8:
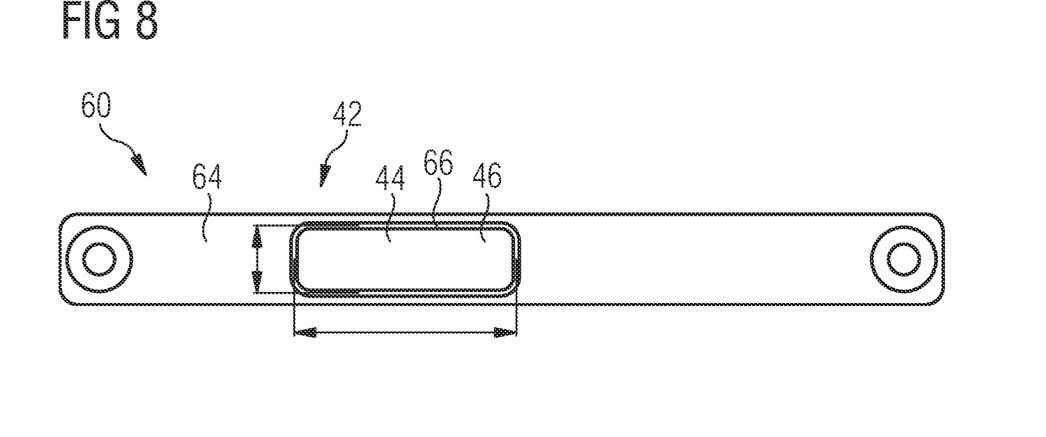
FIG. 8 illustrates a view of a fastening plate.
Figure 9:
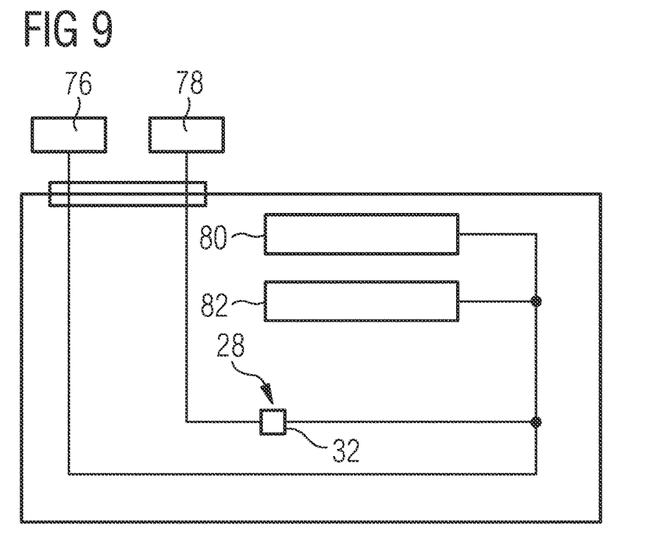
FIG. 9 illustrates a control scheme of the lavatory.
Figure 10:
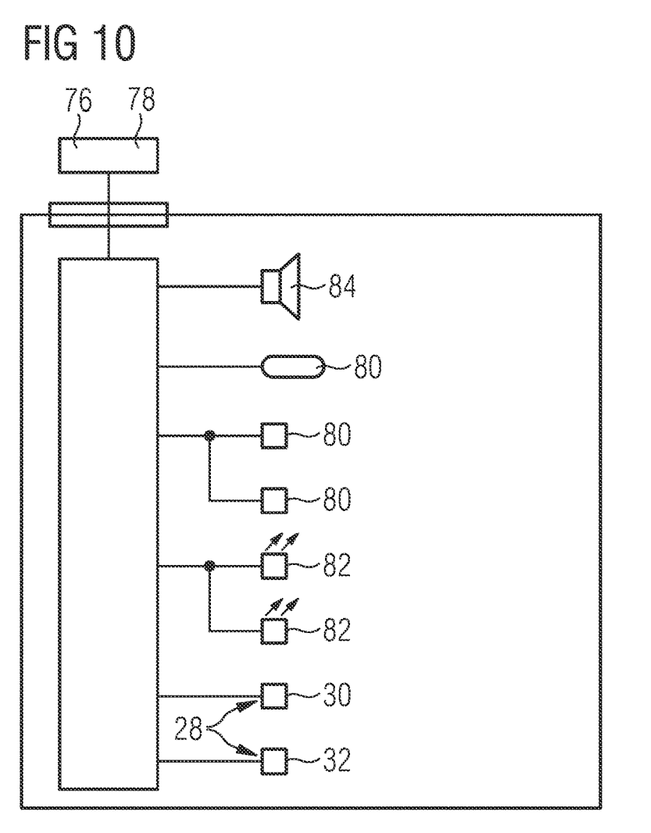
FIG. 10 illustrates a control scheme of the lavatory.

As indicated in FIG. 7, the locking element 24 can have a chamfer 74 adapted to the actuating surface 44. During the movement procedure, the chamfer 74 functions as a sliding surface and therefore facilitates the actuation for the user. As can be seen from FIG. 6 to FIG. 8, the door switch arrangement 20, more precisely the housing device 60, can be configured to be very compact so that installation can also take place in the lavatory door leaf frame 18 with a thickness of not less than 12 mm, preferably greater than 15 mm. Even in the actuated state of the actuating device 42 (see FIG. 7), the overall installation depth is not greater than 70 mm.

Figure 11:
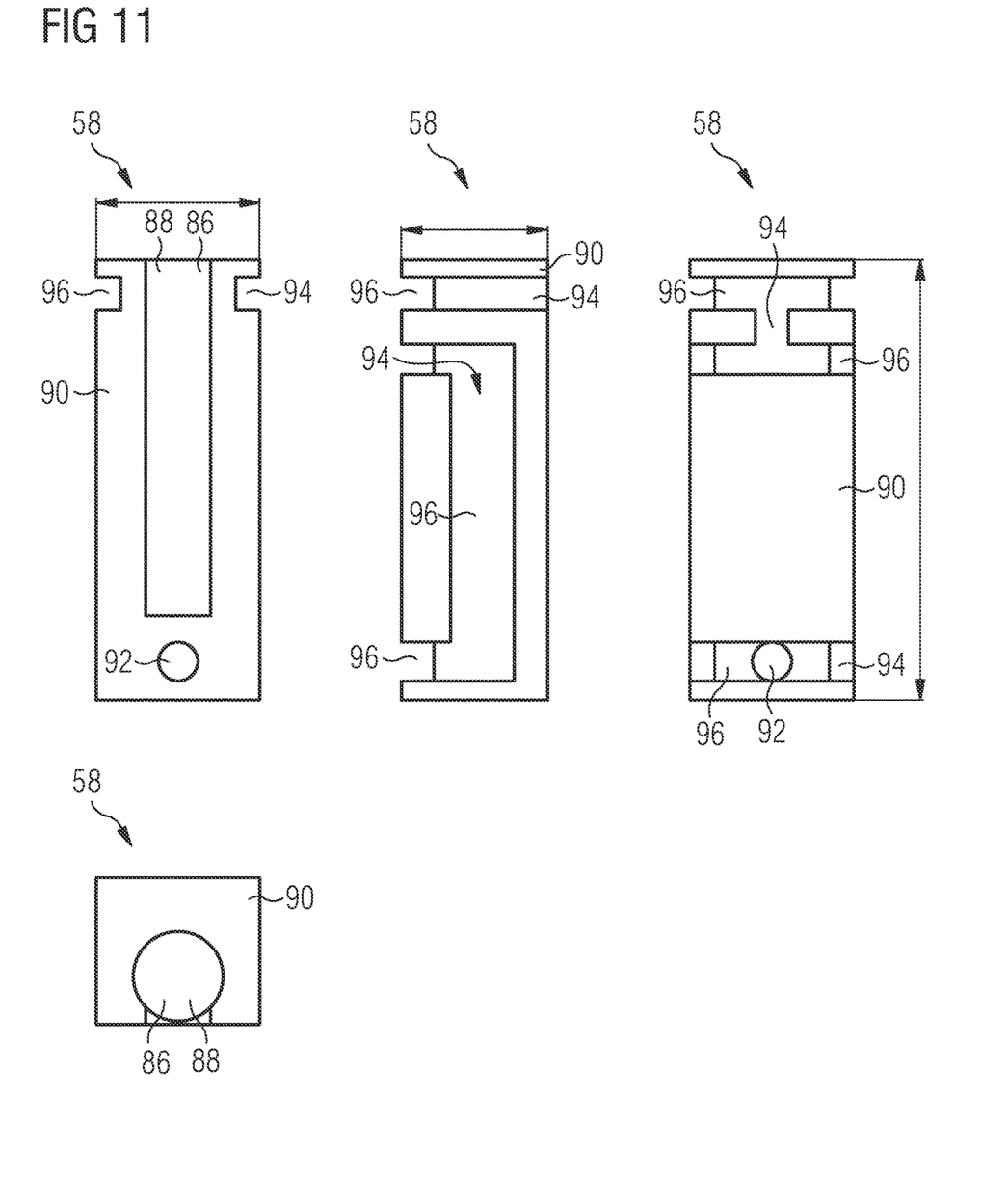
FIG. 11 and FIG. 12 illustrate an exemplary embodiment of an activating device.

FIGS. 11 and 12 are discussed below. As illustrated in FIG. 11, an occupancy display 76 is commonly provided, which gives information as to whether or not the lavatory 12 is currently occupied. To this end, the status of the sensor device 28 is checked as to whether the lavatory door leaf 16 is located in the locked state. In other words, the occupancy display 76 is then set to the status "occupied" as soon as the first sensor 30 has been triggered by the actuating device 42 and the locking signal "locked" is generated by the door switch arrangement 20. Furthermore, this signal can be made available to various cabin systems, for example a crew display device 76, which is located in the cockpit and/or on a flight attendant panel. The locking signal can furthermore be used to control ceiling lighting 80 and/or mirror lighting 82.

Figure 12:
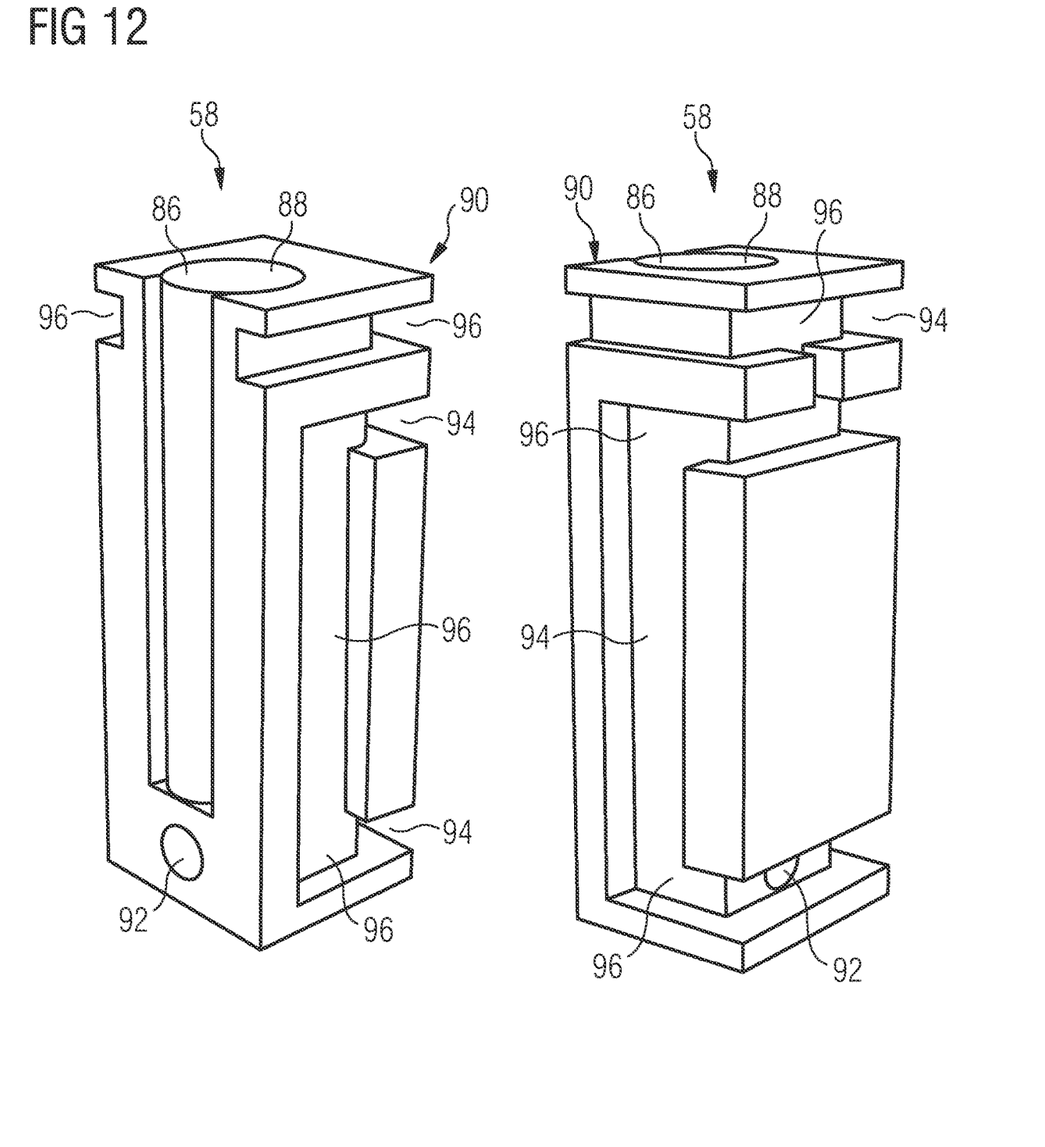

In the variant illustrated in FIG. 12, the closure status signal is also used in addition to the locking status signal.

An exemplary embodiment of the activating device 58 is explained in more detail below, with reference to FIGS. 11 and 12.

The activating device 58 has an activating element 86, which is suitable for activating the sensor device 28, in particular the sensor 32. If the second sensor 32 is designed as a reed contact, the activating element 86 can be designed as an activating magnet 88.

The activating device 58 can furthermore have a holding element 90, in which the actuating element 86 is received for fastening purposes. The holding element 90 can have an inlet opening 92 and a resin channel structure 94 for resin. The resin channel structure 94 comprises a plurality of horizontal and vertical channels which are fluidically connected to the inlet opening 92 so that, after resin has been injected into the inlet opening 92, the holding element 90 is provided with resin on at least three sides.

The activating device 58 can thus simply be integrated in already existing lavatory door leaves 16, whereby simpler retrofitting is possible.

As can be seen in FIGS. 11 and 12, the activating device 58 is configured to be substantially box-shaped and has a base area between 9 mm×9 mm and 10 mm×10 mm, preferably 9 mm×10 mm, and a height of approximately 25 mm to approximately 35 mm, preferably 27 mm.

The mode of operation of the door switch arrangement 20 will be explained in more detail below and possible advantages realized by the door switch arrangement 20 are also described.

Reference is made to the schematic FIG. 3. Firstly, the lavatory door leaf 16 is located in the closed state and the locking element 24 is in the unlocked state. In this state, the actuating device 42 covers the passage opening 66 of the fastening plate 64. The actuating element 54 is located within the region of the first sensor characteristic 34 so that the first sensor 30 announces the locking status signal "unlocked".

Furthermore, the activating device 58 arranged within the lavatory door leaf 16 is located within the second sensor characteristic 38 so that the second sensor 32 emits the closure status signal "closed".

If the lavatory door leaf 16 is now opened by a user, the activating device 58 is moved out of the second sensor characteristic 38 so that the second sensor 32 announces the closure status signal "open". This closure status signal is preferably announced to the crew or the cockpit, for example, via cabin systems which are already present.

Furthermore, the ceiling lighting 80 and/or mirror lighting 82 of the lavatory 12 can be activated as a result of this closure status signal.

If the user now closes the lavatory door leaf 16, the activating device 58 is again located within the second sensor characteristic 38 so that the second sensor 32 emits the closure status signal "closed". If the lavatory door leaf 16 is now locked by the user, the locking element 24 moves through the passage opening and firstly engages with the actuating element 42, more precisely the lever element 46, in particular the actuating surface 44 thereof, with a front end and, in the course of the movement, with its chamfer 74. The actuating device 42 or the lever element 46 is thus pivoted about the lever axis 48 so that the actuating element 54 is moved out of the first sensor characteristic 34. The first sensor 30 now announces the locking status "locked".

Based on the locking status signal and the closure status signal, it can be indicated, inter alia, to the crew, the cockpit and the passengers that the lavatory 12 is occupied. The lighting located in the lavatory 12 can be adapted where necessary.

The user can then unlock the lavatory door leaf 16 again, wherein the actuating device 42, more precisely the lever element 46, is moved back into its starting position. This is brought about on the one hand by the actuating element 54 functioning as a weight and also by the resilient spring element 68. The actuating device 42 or the lever element 46 then cover the passage opening again. Accordingly, the first sensor 30 announces the locking status signal "unlocked" and the second sensor 32 announces the closure status signal "closed".

When the user exits the lavatory 12, the second sensor 32 is in turn triggered so that the closure status signal "open" is temporarily announced.

Compared to known devices, the present door switch arrangement 20 can be realized substantially more compactly. The door switch arrangement 20 is therefore more flexibly usable, more space-saving and, as a result of the contactless sensor device 28, more reliable than the known devices. Moreover, by means of adapter plates, which are not described in more detail herein, the door switch arrangement 20 or the fastening plate 64 can be adapted to different aircraft models or their different lavatory designs 12. In this case, the fastening plate 64 is firstly fastened to the adapter plate, which is in turn adapted to the already existing opening; the adapter plate is then fastened at the point provided for it.

Moreover, in the case of the door switch arrangement 20 presented herein, all components are accommodated in a single unit, which can be installed as such a unit in the lavatory door leaf frame 18. Only the activating device 58 is integrated in the lavatory door leaf 18.

All in all, installation of the door switch arrangement 20 or retrofitting of the door switch arrangement 20 described herein can therefore be facilitated since only a single unit has to be installed in the door frame. Separation into a plurality of mutually remotely positioned components for recognizing the closure status and locking status, as hitherto took place, is not necessary. The activating device 58 is considerably lighter than sensors which are possibly installed in the door leaf, as is likewise hitherto conventional.

To reduce the complexity, solve tolerance problems and increase reliability and customer satisfaction, a door switch arrangement for a lavatory of an aircraft is provided, wherein the door switch arrangement uses a sensor device with contactlessly operating reed sensors to generate signals which indicate the current status of the lavatory door.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Lavatory door device
12 Lavatory
14 Sanitary equipment
16 Lavatory door leaf
18 Lavatory door leaf frame
20 Door switch arrangement
22 Locking device
24 Locking element
26 Operating device
28 Sensor device
30 First sensor
32 Second sensor
34 First sensor characteristic
36 Narrow end face
38 Second sensor characteristic
40 Longitudinal side
42 Actuating device
44 Actuating surface
46 Lever element
48 Lever axis
50 First lever element end
52 Second lever element end
54 Actuating element
56 Actuating magnet
58 Activating device
60 Housing device
62 Housing module
64 Fastening plate
66 Passage opening
68 Spring element
70 Fastening lug
72 Strain-relief device
73 Electrical interface
74 Chamfer
75 Plug connector
76 Occupancy display
78 Crew displace device
89 Ceiling lighting
82 Mirror lighting
84 Loudspeaker device
86 Activating element
88 Activating magnet
90 Holding element
92 Inlet opening
94 Resin channel structure
96 Channel

The invention claimed is:

1. A door switch arrangement for a lavatory door device for an aircraft, having a lavatory door leaf lockable by means of a locking element on a lavatory door frame region,
   wherein the door switch arrangement is configured to generate a closure status signal according to a lavatory door leaf position of the lavatory door leaf and a locking status signal according to a locking element position of the locking element,
   wherein the door switch arrangement comprises a sensor device configured to provide contactless detection of the lavatory door leaf position and the locking element position to generate the closure status signal and the locking status signal.

2. A door switch arrangement for a lavatory door device for an aircraft, having a lavatory door leaf lockable by means of a locking element on a lavatory door frame region,
   wherein the door switch arrangement is configured to generate a closure status signal according to a lavatory door leaf position of the lavatory door leaf and a locking status signal according to a locking element position of the locking element,
   wherein the door switch arrangement comprises a sensor device configured to provide contactless detection of the lavatory door leaf position and the locking element position to generate the closure status signal and the locking status signal,
   wherein an actuating device is movable by means of the locking element and is configured to actuate the sensor device to generate the locking status signal depending on the locking element position, and
   wherein the actuating device has a lever element pivotable about a lever axis as a result of a movement of the locking element, and wherein an actuating element for contactlessly triggering the sensor device is arranged on a first lever element end.

3. The door switch arrangement according to claim 1, further comprising an activating device configured to be movable together with the lavatory door leaf to contactlessly actuate the sensor device to generate the closure status signal depending on the lavatory door leaf position.

4. The door switch arrangement according to claim 2, further comprising an activating device configured to be movable together with the lavatory door leaf to contactlessly actuate the sensor device to generate the closure status signal depending on the lavatory door leaf position,
wherein the sensor device has a plurality of contactless sensors,
wherein a first sensor of the plurality of contactless sensors is configured and arranged to be contactlessly actuated by the actuating device,
wherein a second sensor of the plurality of contactless sensors is configured and arranged to be contactlessly actuated by the activating device.

5. The door switch arrangement according to claim 2, wherein the lever element is pivotable about the lever axis as a result of at least one of a locking movement or an unlocking movement of the locking element.

6. The door switch arrangement according to claim 5, further comprising a fastening plate, by means of which the sensor device is configured to be fastened on the lavatory door frame region.

7. The door switch arrangement according to claim 6, wherein the fastening plate has a passage opening for the locking element, wherein the locking element passes through the passage opening in a locked state.

8. The door switch arrangement according to claim 7, wherein the actuating device is configured to at least one of cover or close the passage opening in an unlocked state of the locking element.

9. The door switch arrangement according to claim 8, wherein the actuating device is configured to cover or close the passage opening completely.

10. The door switch arrangement according to claim 3,
wherein the activating device comprises an activating element held by a holding element,
wherein the holding element comprises an inlet opening for resin and a channel structure, fluidically connected to the inlet opening, for the resin in order to fasten the activating device in the lavatory door leaf.

11. The door switch arrangement according to claim 1,
further comprising a housing device within which the sensor device is accommodated,
wherein the housing device comprises a housing module configured to receive the sensor device.

12. The door switch arrangement according to claim 1, wherein the door switch arrangement is configured to be received completely within at least one of the lavatory door leaf or the lavatory door frame region.

13. The door switch arrangement according to claim 1, wherein the door switch arrangement is configured as an individual installable module.

14. The door switch arrangement according to claim 3, wherein the door switch arrangement, except for the activating device, is configured as an individual installable module.

15. The door switch arrangement according to claim 7,
further comprising a housing device within which the sensor device is accommodated,
wherein the housing device comprises a housing module configured to receive the sensor device,
wherein the passage opening is configured such that the locking element is always located outside the housing module.

16. A lavatory door device for an aircraft, comprising
a lavatory door leaf movable between an open position and closed position,
a lavatory door leaf frame on which the lavatory door leaf is movably mounted, and
a door switch arrangement according to claim 1,
wherein the sensor device is received and fastened at least one of on or within the lavatory door leaf frame.

17. The lavatory door device according to claim 16, wherein the lavatory door leaf is at least one of pivotably, foldably or displaceably mounted.

* * * * *